S. A. LINDSAY.

Harvester.

No. 2,439. Reissued Jan. 1, 1867.

Witnesses:

Chas Youngmann

Nathan Smith

Inventor:

C. Aultman by his attorney

A M Smith

N. PETERS, Photo-Lithographer, Washington, D. C.

UNITED STATES PATENT OFFICE.

C. AULTMAN, OF CANTON, OHIO, ASSIGNEE, BY MESNE ASSIGNMENTS, OF S. A. LINDSAY.

IMPROVEMENT IN HARVESTERS.

Specification forming part of Letters Patent No. 26,944, dated August 2, 1859; reissue No. 2,439, dated January 1, 1867.

*To all whom it may concern:*

Be it known that STEPHEN A. LINDSAY, late of Unionville, in the county of Frederick and State of Maryland, did, in his life-time, invent certain new and useful Improvements in Harvesting-Machines, for which Letters Patent were granted to him August 2, 1859; and that the following is a full, clear, and exact description of the same, reference being had to the annexed drawings, in which—

Figure 1:
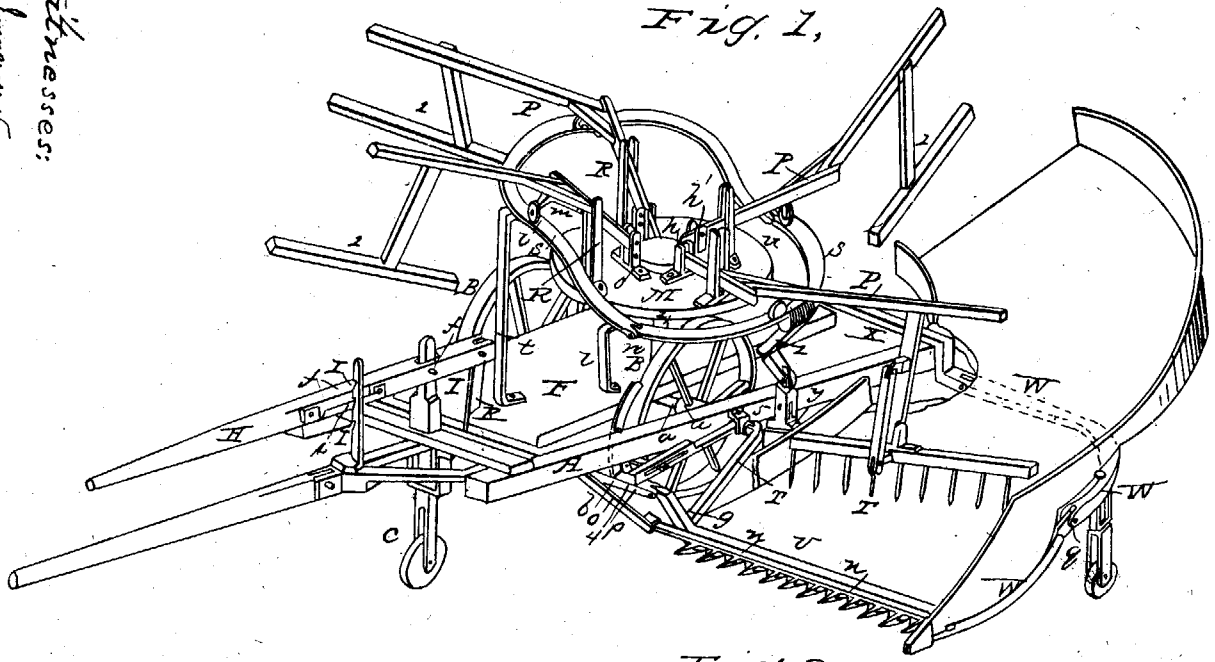
Figure 2:
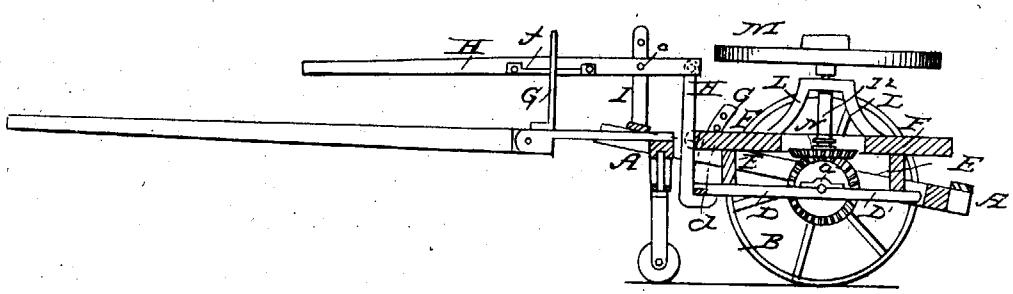

Figure 1 represents a perspective view of the said machine; Fig. 2, a longitudinal vertical section through the frame of the same.

The nature of the invention of the said STEPHEN A. LINDSAY relates to the attachment of an automatic rake, delivering the grain in the arc of a circle, to a harvester with a hinged platform; and consists in the manner of hinging the platform of the harvester and attaching the apparatus for supporting and driving the rake, and connecting the raking apparatus to the platform, so that both the platform of the harvester and the rake shall rise and descend simultaneously when the machine passes over uneven or broken ground.

A represents the frame of the machine, which is supported by the two driving-wheels B on the axle *a*, and by the caster-wheel *c*, which is secured to a brace on the front end of the frame. This frame, being supported by the three wheels described, cannot be raised or lowered, and its weight does not bear on the team, as in machines which are supported on two driving-wheels only. Within the frame A is hung another movable frame, which consists of two longitudinal bars, D, which are hung to the driving-shaft *a*, and two cross-pieces, E, to which the platform F is secured. The front ends of the bars D rest on a cross-bar, *p*, which is provided at both its ends with circular guide-pieces G, which can slide freely in suitable slots in the frame A, and which are perforated with holes 10 for the insertion of a pin to hold the frame in any desired position. H represents a hand-lever, which is pivoted to the standard I, and has its fulcrum at *c*. K represents a rod which is pivoted to the end of the hand-lever H, and the lower bent end *d* of which supports the cross-bar J. *f* represents a stop-plate, which is secured to the side of the lever H, and the edge of which, when resting in one of the notches 1 of the standard *g*, holds the lever H, and consequently the movable frame, in any desired position. 12 represents a vertical shaft, which is held in its position and has its bearings in the vertical support L. M represents a circular head-wheel, which is secured to the shaft 12, and which is rotated when the bevel-wheel N is operated upon by the bevel-wheel O. P represents four arms, to which the reels 2 and rake *z* are respectively secured. Their inner ends are hinged or pivoted at the boxes or bearings K K to the standards Q, and can freely play on their hinged points, while the arms P are guided in their vertical motions by playing within the vertical guide-pieces R. *l* represents friction-rollers, which turn on the brackets *m*, they being secured to the arms P. These friction-rollers support the arms in their circular motion by running on the guide-piece *s*, which is supported by suitable rods *t*. The shape of the latter is represented in Fig. 1. When seen in a top view it appears in a true circular shape, which has the shaft 12 as its center. From a side view it appears as two half-circles, which are connected by inclines, and as the rake-arms rest on said guide-piece by means of their friction-rollers it follows that they are raised and lowered alternately, according to the shape of the guide-piece *s*. T represents the platform of the harvesting-machine. *n* is the cutter-bar, which is driven by the pitman *o*, the latter being actuated in the usual manner. The frame of the platform is composed of a finger-bar, U, which is hinged at *p* to the bar *b*, and the frame-pieces V and W, which are hinged together at *q*, while the piece W is hinged at *r* to the bar *x* of the frame A. The outer end of the platform is supported by a caster-wheel, Y, the shaft of which passes through the frame-piece W. Thus, it will be seen that, when the outer end of the platform is raised or lowered, it will turn freely on the hinged joints *r* and *p*.

But it is essential that the rake-head should move simultaneously with the platform, if the machine shall work without interruption. To accomplish this I make the circular guide-piece *s* of two pieces, which are hinged together at *u* in such a manner that one of the pieces may be turned on said hinges while the other remains stationary, and connect the movable part of the guide *s* to the frame of the platform T by means of the links *v* and *w*, which are respectively secured to the arm *x* of the guide-piece *s* and to the post *y* of the platform-frame, and by this arrangement the guide-piece *s* is raised or lowered by a corresponding movement of the platform, and thus the rake *z* and reels 2 are caused to clear the platform with the same space between them, no matter to what position the platform is brought by the roughness of the ground. As above described, rake *z* is shown as attached to one of the arms P, while the arrangement of the other arms is such as to act as reels, it being evident that in this arrangement a reel of the usual construction could not well be applied to the machine.

The following is the arrangement by which the front end of the platform may be raised or lowered without interfering with the proper and effectual operation of the rake and reels. By operating the lever H the bar *b*, which is suspended to the rod K, and consequently the frames D F, and the platform M are raised and lowered, and as the finger-bar U is hinged to the cross-bar *b* it follows that it would turn on said hinge and not participate in the movement of the frames, as described. To effect this simultaneous movement a bar, 3, is employed, which is secured at 4 to the bar *b*. The end of the bar 3 is secured to a small shaft, 5, within the bracket 6 on the stationary frame A, so that when the bar *b* is raised or lowered the shaft 5 will be turned on its bearings in the bracket 6. 7 represents another bar, which is pivoted at 8 to the shaft 5, and the end 9 of which is firmly and rigidly secured to the cutter-bar U, and thus, as the bar *b* is raised or lowered, the shaft 5 will be turned and the bar 7 will cause the cutter-bar U to follow the motion of the bar *b*, while the free motion of the platform T is not interfered with by reason of the pivoted joint at 8.

Having thus described the nature of the invention of the said STEPHEN A. LINDSAY, what is claimed therein as new, and desired to be secured by Letters Patent, is—

1. An automatic rake delivering the grain in the arc of a circle, in combination with a hinged platform.

2. The combination of a revolving rake and reel and a hinged platform.

3. The combination of a revolving rake and reel, with a hinged platform suspended from the main frame.

4. In a harvester, having a revolving rake and reel, suspending the hinged platform to the main frame at one or more points between the driving-wheels.

5. The combination of a revolving rake and reel with a hinged cutting apparatus, in such a manner that the said cutting apparatus can be raised and lowered without changing the relative position of the rake and reel to the platform.

6. The employment of radial reel and rake arms, attached to the central head or axis by independent hinges or pivots for each radial arm.

7. Attaching the beaters and rake-heads at such an angle with a radial line that the rake-heads and beaters shall approach to and pass over the cutter in a line nearly parallel to the cutter when the axis of the rake and reel is located in the rear of the cutter-bar.

8. The boxes or bearings K K, for carrying the pivoted radial arms, in combination with the central revolving hub.

9. The combination of a revolving rake and reel, a vibrating frame, or its equivalent, and a hinged platform.

10. Arranging the revolving rake and reel-support to vibrate about a gear-center, so that the raising or lowering of the cutters does not interfere with the operation of the driving mechanism.

11. The combination of a revolving rake and reel apparatus, which is supported between the driving-wheels and a hinged platform by means of an intermediate connecting-piece, for the purpose of conforming the movements of the rake to the platform in passing over uneven ground.

12. The combination of a quadrant platform, a hinged finger-beam, and a frame supported on two wheels.

13. The combination of a quadrant platform and a hinged finger-beam suspended from a frame supported on two wheels.

14. The combination of a quadrant platform, a hinged finger-beam, a two-wheeled frame, and a rake, moving in the arc of a circle.

CORNELIUS AULTMAN.

Witnesses:
W. W. CLARK,
J. J. CLARK.